May 3, 1960
M. J. HILER
2,935,394
METHOD AND APPARATUS FOR PRODUCING MICRON
AND SUB-MICRON METALS
Filed April 16, 1956
3 Sheets-Sheet 1
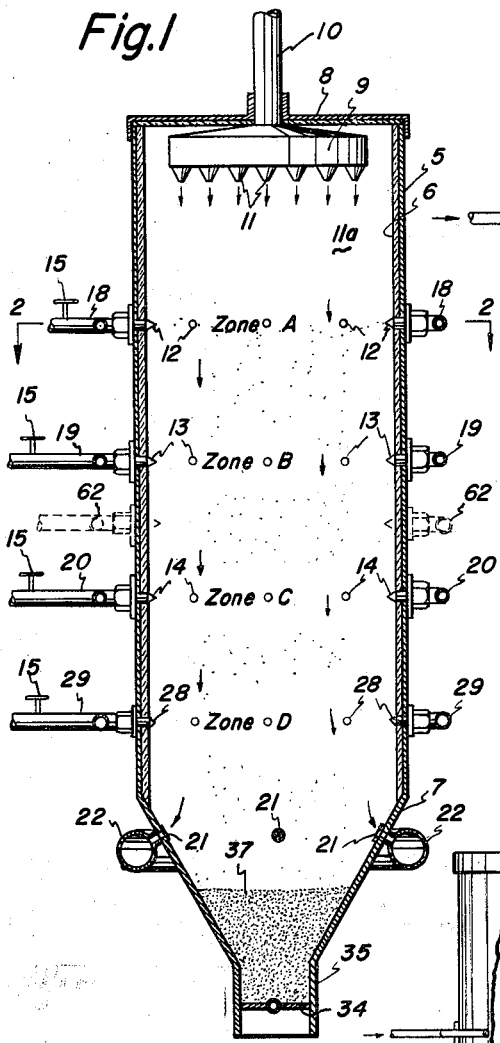
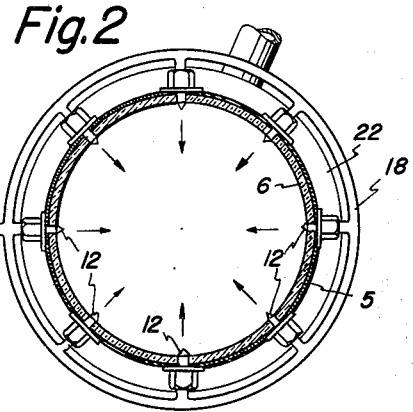
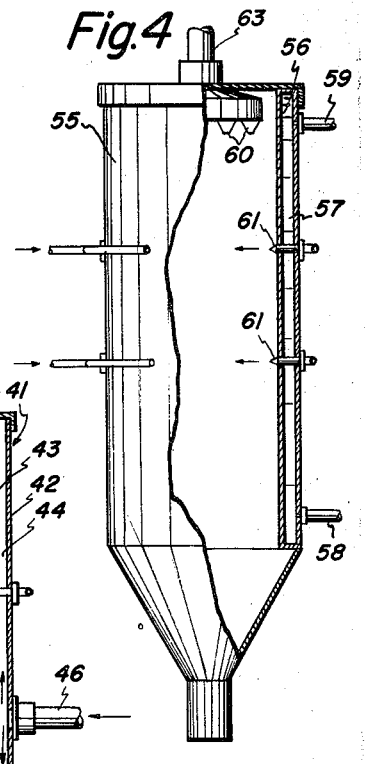
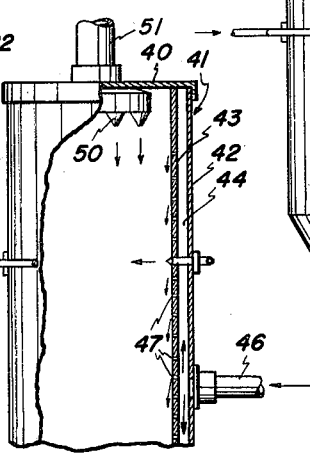
INVENTOR
MALVERN J. HILER
BY Toulmin & Toulmin
ATTORNEYS

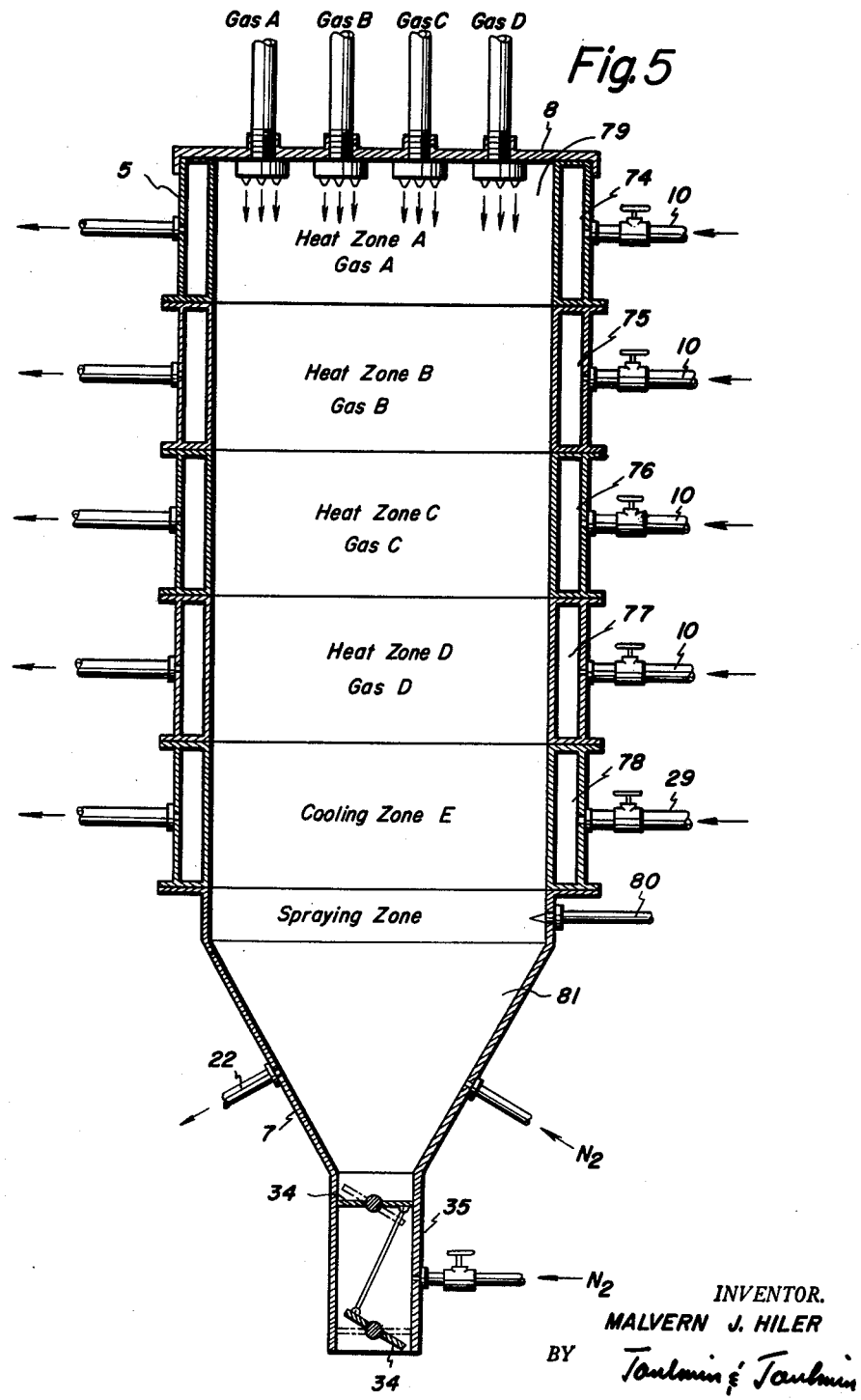

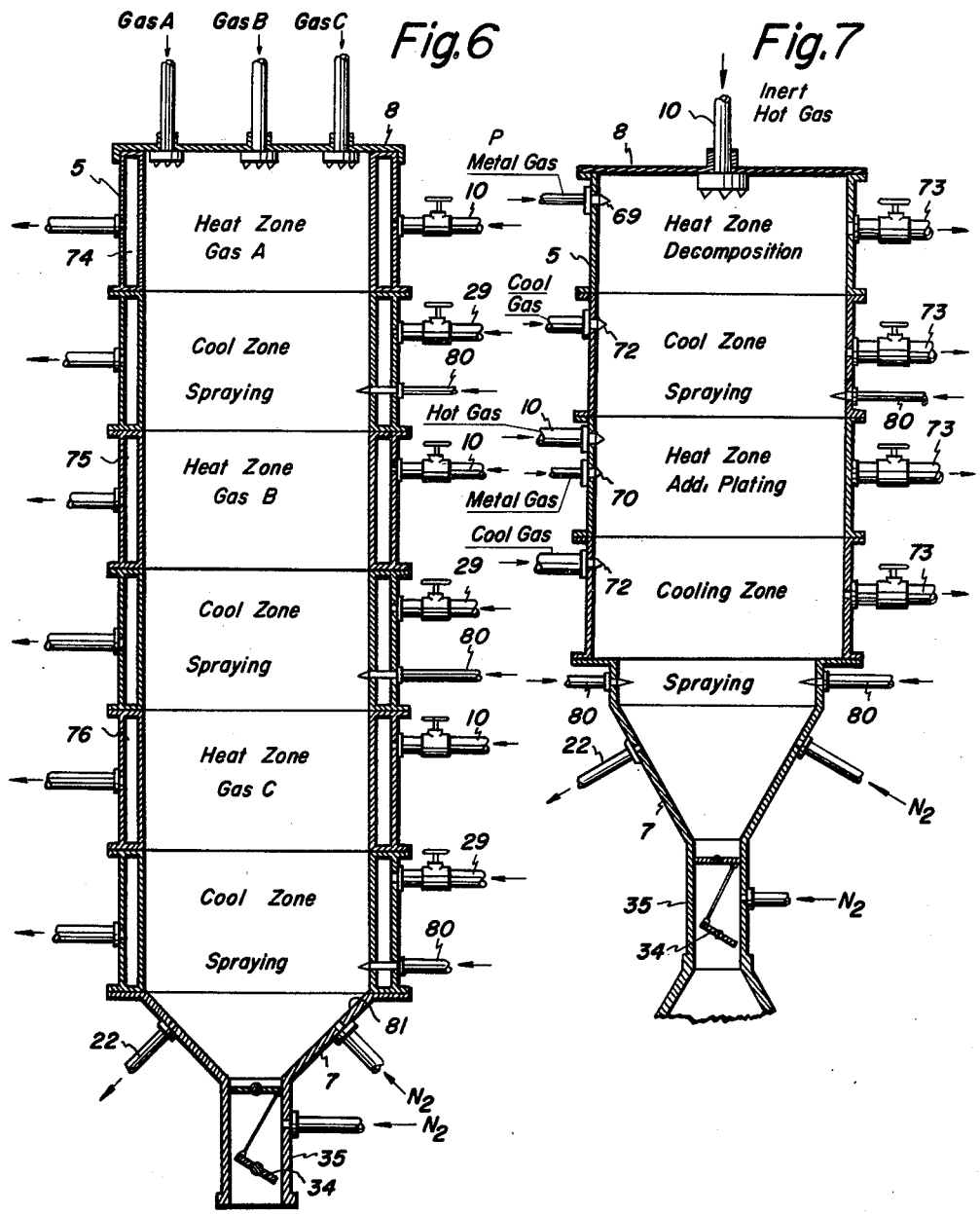

United States Patent Office 2,935,394
Patented May 3, 1960

2,935,394

METHOD AND APPARATUS FOR PRODUCING MICRON AND SUB-MICRON METALS

Malvern J. Hiler, Dayton, Ohio, assignor to Commonwealth Engineering Corporation, Dayton, Ohio, a corporation of Delaware Application April 16, 1956, Serial No. 578,347

6 Claims. (Cl. 75—.5)

This invention relates broadly to metal particulates of low micron and submicron size and a method of producing the same. More particularly, the invention appertains to the production of metal which is in the form of very fine discrete particles of low micron or submicron sizes. I have discovered that the low micron and submicron matter so produced has a whole new order of chemical reactive properties and new physical relationships not found in matter of larger sizes.

Metal particulates made in accordance with this invention are useful commercially. They may act as catalysts in carrying out catalysis and, while the invention will be described with particular reference thereto, it will be understood that it is not limited to such use, the product having many uses including, for example, powder metallurgy, fuels, explosives and metal coating applications.

Catalysts are appraised by a number of factors, such as resistance to thermal shock, simplicity of preparation, ease of regeneration, and effective contact area. The latter factor is a function of the physical characteristic of the metal particles. The smaller the particle size, the greater the contact surface area made available for the same amount of catlyst. In the use of such catalysts, to secure an effective contact between the reactant and the catalyst in contact catalysis, the reactant is passed over the solid catalyst, the latter usually comprising small, uniform size particles or pellets. The catalsyts of this type have been found to be most effective when used as a fluidized solid. In this type of catalysis, the catalyst comprises a bed of discrete particles which can be arranged into a condition resembling a liquid.

The following table illustrates the change in surface area of spherical shaped particles as the diameter of the same are reduced:

| Sphere Diameter | Number of Spheres | Total Area, cm.² |
|---|---|---|
| 2 cm | 1 | 12.5 |
| 1 cm | 8 | 25 |
| .1 cm | $8 \times 10^3$ | 250 |
| .01 cm | $8 \times 10^6$ | 2,500 |
| .001 cm | $8 \times 10^9$ | 25,000 |
| .0001 cm. (1 micron) | $8 \times 10^{12}$ | 250,000 |
| .00001 cm. (.1 micron) | $8 \times 10^{15}$ | 2,500,000 |
| .000001 cm. (.01 micron) | $8 \times 10^{18}$ | 25,000,000 |
| .0000001 cm. (.001 micron) | $8 \times 10^{21}$ | 250,000,000 |

This table shows clearly the enormous area increase as particle size diminishes. Thus, for example, while the original sphere had the area of a large postage stamp, when made into particles 1 micron in size, the area is now equal to that of a boxing ring. Since we know that reaction rate is a function of area, it is clear to see the advantage of using smallest possible particle size in chemical reactions where the rate of energy release is to be maximized.

Attempts by others to achieve very fine metal particulates for catalyst purposes may be seen, for instance, in United States Patent No. 2,714,116 granted to Teichmann et al. covering a method of making a metal "smoke" comprised of fine particles. In accordance with the process of the present invention fine metal particulates are produced without the use of high temperatures such as required to liquify the native metal and then to vaporize it from the fluid state.

The present invention provides for uniform temperature operation and particle size control by means of rate of decomposition of chemical organics in gaseous diluting atmospheres designed to prevent oxidation of the catalyst particles, except when and as desired, in order to achieve highly reactive products.

Another important application for metal particles of submicron size such as produced by the method of my invention is in the carrying out of chemical reactions where the particles are actually consumed. Thus the use of boron and aluminum particles of submicron size in propellants and explosives are highly desirable since the reaction rate is a most important factor of such a product.

The physical applications of submicron particles of this invention are also very interesting and useful particularly in the field of powder metallurgy.

The present invention provides a product in the form of very small discrete particles, and which are useful as catalyst or the like where increased area of activity is created by the submicron or low micron size of the particles. Such ultra fine particles, as desired, may be composed of a single metal or a plurality of metals or one metal plated on another or upon an inorganic base.

A principal object of the present invention accordingly, is to produce very finely divided metal particles, preferably composed of two or more metals, the particles being of submicron size to furnish the maximum surface area for the maximum reaction.

It is an object of this invention to provide as the heating factor in controlling the discharge of metal particulates without consolidating them into a plate to utilize a hot gas so heated in a particular zone through which the metal bearing gas passes that the particulates will be formed and deposited as independent low micron and submicron units by immediately thereafter passing them, before they can consolidate on a surface, through a cold zone to prevent them from adhering to any surface to form a plate.

It has heretofore been the practice to heat a surface and to bring the metal bearing gas into the presence of the heated surface so that the metal will be applied as a plate, but the instant application has a reverse objective, i.e., preventing any plating except in the case of diverse metals in particulate form for forming alloy particles. It is, therefore, necessary to control the decomposition for the application of a hot gas, preferably heated in a zone, through which the metal bearing gas passes to cause the dropping from the metal bearing gas of the metal particulates and stopping any such further action which may result in plating by having these particulates and the remainder of the metal bearing gas pass through a cooling zone to stop the reaction.

Another object of the invention is to provide a multicomponent powdered metal catalyst which is in the form of fine particles of substantially uniform size diameter or thickness by passing each metal bearing gas into a heating zone, using a heat of its particular decomposition point. The core may consist of inorganic or organic material, the metal being deposited by gaseous plating, e.g., by heat-decomposing a gaseous metal compound and causing the metal constituent to be deposited or precipitated as finely divided particles.

Another object of the invention is to provide a metal powder product which is useful in powdered metallurgy for example, in the manufacture of sintered products.

Another object of the invention is to provide metal powders wherein the particles are made up of one or more metals co-precipitated to form a composite metal particle.

Another object of the invention is to produce small uniform size particles of metal which are preferably on the order of one micron or less size, the same being of substantially uniform particle size.

A prime object is to coat the metal particulates as formed with a non-oxidizing coating to prevent the formation of oxides that materially affect the catalytic reactant effect of the particulates and their ignition and explosive properties as well as to provide a reactant to trigger the reaction of the metal particulate.

Another object of the invention is to produce micro and submicro particles of metal under controlled conditions, such as inert gas, to prevent ignition and explosion, whereby, after formation of the fine metal particles the reaction is terminated, to prevent the building up of the particles into larger size particles than desired and the particulates are protected against premature reaction.

Another object of the invention is to provide composite particles of metal which are useful as alloy metal particles, particularly where the exterior metal is the reactant and the interior substance is a carrier.

Another object of the invention is to produce metal powders which are corrosion resistant and which have utility in the field of corrosion resistant coatings for application to metal surfaces and the like.

Another object of the invention is to provide fine grain metal particles which have magnetic or non-magnetic physical properties, as desired, depending on the use to which the product is to be put for use in electrical equipment.

A further object of the invention is to produce very fine metal particles of submicron or low micron size which are useful in the manufacture of explosives, fuels, and the like.

Another object of the invention is to provide a relatively simple and efficient method of making powdered metal.

A further object of the invention is to produce metal powders or alloy metal particles which are discrete and on the order of a low micron or submicron size, and which may be pelletilized and shaped to form articles as in powder metallurgy.

In carrying out the process of the invention, a suitable apparatus may be employed such as that shown diagrammatically in the accompanying drawings, in which:

Figure 1 illustrates in vertical cross section an elongated reaction chamber for carrying out the mixing of the metal bearing gases and heat-exchange cooling gas for terminating the process at the desired stage;

Figure 2 is a cross-sectional view taken on the line 2—2 of Figure 1 and looking in the direction of the arrows;

Figure 3 illustrates a modification of the apparatus shown in Figure 1 in which the side walls of the reaction chamber are cooled by an outer shell through which cooling fluid is passed to a perforated inner wall to provide a cool layer of gas contiguous with the side walls of the reaction chamber, the apparatus being shown partly in section and broken away to better illustrate the construction of the apparatus;

Figure 4 illustrates similar apparatus as Figure 1, wherein the side walls of the reaction chamber are cooled by an outer jacket through which cooling water or similar fluid is circulated;

Figure 5 shows an arrangement of supplying different metal organics of different temperatures of decomposition for metal deposit in a chamber having controlled heating zones for successive precipitation of different metals and alloys;

Figure 6 shows in arrangement for coating the metal particulates as formed to prevent formation of metal oxide coatings on the particulates; and Figure 7 illustrates the use of means for creating a vacuum in the heating chamber to cause the gases to flow, to reduce the temperature necessary for precipitation and to provide a cooling zone and a spraying zone for effective stopping of the reaction and of coating the metal particulates to prevent deterioration and combustion, as well as oxidation.

In the apparatus illustrated in Figures 1 and 2, an elongated chamber or tank 5 is provided having a glass or vitreous enamel liner 6; the bottom portion 7 of the chamber being funnel-shaped to receive and collect the powdered metal particles.

Arranged at the top of the reaction chamber, and suitably supported on the cover 8, is a header 9 which communicates with a conduit 10 through which hot inert gas is conducted thereinto and discharged in the upper portion of the reaction chamber. For uniformly delivering hot inert gas, such as carbon dioxide ($CO_2$), nitrous oxide ($N_2O$) and nitrogen (N), downwardly into the reaction chamber from the header 9, as indicated by the arrows in Figure 1 suitably nozzles 11 are provided which communicate with the header. By using a deterring head of this type the hot gases are directed in a core 11a with a coating area around the core and located adjacent the inner wall of the container.

Spaced vertically along the side walls of the reaction chamber are nozzles 12, 13 and 14, through which heat decomposable gaseous metal substances, such as the metal carbonyls, may be admitted, as desired, to the interior of the reaction chamber. Suitable valves 15 are provided for controlling the flow of gas through the sets of nozzles whereby one or more of the same may be shut off. Nozzles 12 are suitably connected through conduit 18 to a source for supplying gaseous metal compounds under pressure. For example, nickel or copper carbonyl, metal hydride, etc. may be stored in a tank or suitable container for this purpose. Nozzles 13 and 14 are likewise connected through the conduits 19 and 20 respectively to a source of gaseous metal supply. A different heat decomposable metal compound in liquid or gaseous form is introduced through the nozzles 12, 13 and 14, as desired. The vertically spaced rows of nozzles through which gaseous metal plating compounds are introduced are arranged in the side walls of the reaction chamber 5 to provide the reaction zones A, B and C, as illustrated in Figure 1. Heated inert gas as a diluent flows through conduit 10 and nozzles 11 and streams downwardly through the chamber 5 and is exhausted along with waste gases through openings 21 into the manifold 22.

To terminate the reaction at the desired time, a cooling zone D is provided wherein a suitable cooling gas, such as carbon dioxide, nitrogen, nitrous oxide, argon or helium, is introduced into the reaction chamber through nozzles 28, which nozzles are connected through line 29 to a source of cooling gas. Waste gases exit also through the discharge openings 21 in the bottom side wall section 7 of the reaction chamber, as illustrated in Figure 1.

A valve means 34 is provided in the bottom cylindrical portion 35 of the reaction chamber 5. This valve is actuated intermittently to discharge particulate metals such as collect in the lower portion 37 during the operation. Usually this area is charged with an inert gas to prevent combustion.

Employing the apparatus illustrated in Figures 1 and 2, composite metal particles are formed, the initial nuclei or core of metal being formed in zone A and metal layers may or may not be deposited on the nuclei particles as it passes downward through zones B and C. The metal particle formed in zone A passes downwardly through zones B and C and thence to cooling zone D, where the action is halted.

Each heat zone is adjusted to secure metal from that particular gas whose heat of deposit point differs from other metal bearing gases entering the chamber.

By controlling the flow of gases through the reaction chamber and time of stopping the reaction by change of temperature or a controlling gas, the size of the metal particles may be controlled. Further, by varying the rate of decomposition of the heat decomposable gaseous metal compound as by the application of higher and lower temperatures and changing the flow rate of gases through the reaction chamber, the fineness of the particles and speed of formation may be regulated. For example, upon increasing the rate of input of decomposable gaseous metal vapors to the reaction chamber with a correspondingly increased rate of input of hot inert gas to bring about heat-decomposition of the gaseoue metal compound results in the production of finer metal particles than where the rate in input of gases is lower.

Decomposition may also be effected by internal or external heaters such as high frequency heating, hot chambers as in Figure 7 and a variety of other ways of applying heat to cause the metal to be dropped by its carrier gas.

A feature of the invention comprises the use of a cooling zone wherein cold inert gas is introduced to halt the decomposition of the gaseous metal compound so that the particle size of the metal powder can be controlled. Further, by raising or lowering the cooling zone with respect to the reaction zone wherein the gaseous metal compound is heat decomposed, as in zones A, B, or C, substantially uniform size particles of metal are produced and the tendency of the particles to stick together or agglomerate is avoided.

Another important feature of applicant's invention is that of providing a reactor or reaction chamber having side walls which are maintained below the temperature of that of the central part of the reactor to prevent the deposition of metal thereon and this is accomplished by delivering a defined body of hot gases at high velocity to form a core of hot gas bearing metals surrounded by a layer of cool gas inside the lower walls to prevent deposit of metal on the lower inner walls.

This is accomplished by making the walls of heat insulated material or they may be cooled artificially. In the embodiment shown in Figure 1, the side walls and top of the reaction chamber or tank are lined with vitreous enamel or it may be made of glass. The smooth vitreous surface which has a low heat conductivity and is cooled by the surrounding atmosphere presents a wall surface of lower temperature than that in the central portion of the reaction chamber and spaced from the side walls. There is accordingly little tendency for the gaseous metal compound to be decomposed while in direct contact with the walls of the reaction chamber and to deposit metal thereon. Such particles as they are formed gravitate and are carried downward by the flowing stream of inert gas into the cooling zone and are at length collected in the bottom of the chamber.

When it is desired to form metal particles composed of but a single metal, then of course, the nozzles other than for example zones A and D are cut off. Similarly, when metal particles composed of but two metals are desired, nozzles of zone C are shut off while heat decomposable metal gases are introduced through the nozzles in zones A and B.

In Figure 3 there is illustrated an elongated tank or reaction chamber 40 which is equipped with fluid cooled side walls as generally illustrated at 41. The construction of the side walls, as shown, comprises an outer solid wall 42 and inner perforated wall 43, the latter being spaced from the outer wall to define a shell or hollow chamber 44. Cooling gas such as carbon dioxide, nitrogen or the like is admitted to the hollow chamber 44 through a conduit 46, and the gas flows inwardly into the reaction chamber through the perforations 47 in the inner wall 43. Hot inert gas is discharged downward centrally of the reaction chamber from nozzles 50, the preheated gas being conducted thereto through conduit 51. This cool gas flows downward and contiguous with the surface of the inner wall whereby the same is maintained at a temperature sufficiently below that which will cause decomposition of the gaseous metal compounds introduced into the reaction chamber.

In Figure 4 similar elongated tank or reaction chamber 55 is illustrated wherein the side walls 56 are cooled by a fluid-filled jacket 57 through which suitable fluid, e.g., water, mercury or the like is circulated, the fluid being introduced through a conduit 58, and drawn off through a conduit 59. In this construction the walls of the reaction chamber are thus maintained cooled to a temperature at least below that at which the gaseous metal compound, such as may be introduced through nozzles 61, will decompose upon contact therewith. Heating inert gas, e.g., $CO_2$ is discharged into the reaction chamber through nozzles 60 of the header or manifold to which the hot gas is conducted by conduit 63. In this manner, the formation of fine metal particles is effected in the gaseous medium of the reaction chamber, thus minimizing the deposition of metal on the walls of the chamber.

In Figure 5, the metal bearing gases are separately delivered in parallel spaced from the inner side walls of the chamber 5 and forming their heating zones in the heating chambers 74, 75, 76 and 77 and the cooling chamber 78.

The purpose of the high velocity metal bearing gases being used in multiple or single form is to so arrange them that their velocity will form a column of gas that will have a space indicated generally at 79 between the side wall of the column of gas and the heated walls of the chambers 74–78 inclusive to prevent metal deposition on the interior wall of the chamber.

By having multiple gases it is possible to deposit the metals of each gas so that gas is conveyed into the heat zone which corresponds to its heat of decomposition. Thus one metal may be caused to coat another metal or the metals will fall freely in low micron or submicron condition where they may be optionally coated with a stearate or other coating and be deposited in the zone of natural inert gas such as nitrogen and the like.

As an example, nickel can be coated on steel, copper on ceramics, nickel on cadmium, magnesium, sintered brass, glass, etc., tungsten can be coated on steel, aluminum on magnesium, silver on steel, chromium on copper, nickel on Teflon.

The spray member is designated 80. The inert gas chamber and collecting chamber is designated 81.

The further advantage of coating the metal particulates is that in the presence of oxygen supplied by liquid air, hydrogen peroxide and the like, when these particulates are used in fuels, propellants, etc., there is an unusual release of energy, as the rate of burning or the rate of energy release is influenced by the particle size since the reaction rate is a direct function of the reactive surface. The reaction rate for such burning phenomena is a linear function of the particle size. The particle size decreases the formation of an oxide coating. The production of low particle size metal particulates in inert gas is important to eliminate oxide formation. The coating of stearate on the metal particulates preserves the metallic surface and at the same time permits later mixing with air without spontaneous combustion until the reaction is triggered by suitable means.

Figure 6 is similar to Figure 8 with the exception that it provides for the coating of the metal particulates after the reaction has been stopped by the cooling zone at a time when the spray will coat the metal particulates and will be hardened by the cooling zone.

Referring to Figure 7, the pipes 73 are connected at one end to the chamber and at the other end to a vacuum pump in order to reduce the pressure in the chamber, both in the heating zone and in the cooling zone. While the metal particulates are being deposited, the cooling zone halts the reaction and then the metal particulates pass through the stearate sprays for a coating to prevent oxidation while the metal particulates are deposited in an inert atmosphere of carbon dioxide, nitrogen, nitrous oxide and the like.

Gaseous metal compounds which are to be decomposed are suitably introduced through the sets of nozzles 69 and 70 communicating with the reaction chamber similarly as illustrated and described in the apparatus of Figure 1. Where desired, fine dust metal particles may be introduced into the reaction chamber to initiate the decomposition as by "seeding." Recycling of a portion of the gases from the exhaust line back to the system may also be effected. Cooling inert gas for stopping the metal deposition process in introduced through nozzles 72. Dilution of the heat decomposable gaseous metal substance fed into the reaction chamber, as desired, may be effected by employing inert carrier gas such as carbon dioxide, helium, etc. as heretofore described.

Where it is found that the hot inert gas introduced into the upper part of the reaction chamber is insufficient to bring about the heat decomposition of the gaseous metal compound introduced in the lower zones, for example, zone C as illustrated in Figure 1, then additional nozzle means, such as indicated in dotted lines at 62, may be provided for introducing hot inert gas to the reaction chamber similarly as at the top and above zone A. In this way the streams of hot inert gases flowing downward to the exit openings 21 is kept at a temperature such as will bring about decomposition of the different gaseous metal compounds introduced in the different zones of the reaction chamber and depositions at different times.

Heating of the inert gas passing to the reaction chamber may be executed in any suitable manner as by flowing the dry gas over or around a heating element prior to introducing it into the reaction chamber. The process is preferably carried out without the use of vacuum pumps and utilizing motor driven blowers to force the gases through the reaction chamber and outward at the lower end as illustrated by the arrows in Figure 1. If desired, a blower may be connected to the exhaust pipe line 22 to assist in withdrawing waste gases from the reaction chamber and to bring about an even flow of gases downward through the apparatus.

The volume of the powder and particulate size which is formed may be controlled by regulating the concentration of the gaseous metal compound present in the reaction mixture. In general the less the dilution of the heat decomposable metal gaseous compound, the smaller is the bulk or density of the particle formed. In the case of nickel carbonyl, for example, as may be employed to produce nickel metal powders, the concentration of the carbonyl vapor in the gases is preferably on the order of 75% by volume of the gaseous reaction mixture.

A volume ratio of 75 to 80% gaseous metal carbonyl to 20 to 25% dilution with carbon dioxide carrier gas provides an effective mixture. To form the initial nuclei particle of metal in zone A it is preferable to use initially a high concentration of metal bearing compound, e.g., 95% by volume of the metal bearing gaseous compound to 5% or less by volume of hot inert gas including any carrier gas. The proportion of gaseous components in the mixture in each case, of course, will vary depending upon the particular gaseous metal compound used and gaseous heating medium employed. The pressures used are atmospheric or low vacuum, the gaseous material being forced through the reaction chamber at a flow rate such as will permit the gaseous reaction to take place.

Molybdenum hexacarbonyl likewise is ordinarily in the physical form of colorless orthorhombic crystals which decompose with vaporization at about 150° C. and above.

In carrying out the process for the production of metal powders, all metal compounds which are heat decomposable and which disassociate to release the metal component may be used. Examples of such compounds are carbonyls, hydrides, halides, nitrides and metal-organic compounds. Thus the carbonyls of nickel, iron, chromium, molybdenum, tungsten and cobalt may be utilized; alkyls, the hydrides of copper, antimony, tin, germanium and others are useful; the halides include the chlorides, iodides and bromides of metals, such as nickel iodide, nickel chloride, osmium carbonyl bromide, aluminum chloride; other metallic compounds include copper nitride, chromium nitride, copper nitroxyl, cobalt nitrosyl carbonyl, metallic acetyl acetonates, e.g., copper acetyl acetonate, as shown in the following tables:

TABLE I

*Physical properties of various carbonyls*

| | Molecular Weight | Decomposition Temp., °C. | Specific Gravity | Boiling Point, °C. | Melting Point, °C. | Physical Form |
|---|---|---|---|---|---|---|
| Nickel Carbonyl, Ni(CO)$_4$ | 170.73 | 190–205° | 1.318 | 43° | −25 | Colorless liquid or gas, soluble in alcohol, ether, benzene. |
| Iron Pentacarbonyl, Fe(CO)$_5$ | 195.89 | 150° | 1.466 | 102.5° | −21 | Yellow viscous liquid, soluble in benzol, ether, alcohol. Other Iron Carbonyls are Fe$_2$(CO)$_9$, Fe(CO)$_4$. |
| Chromium Carbonyl, Cr(CO)$_6$ | 220.01 | 150° | | Decomposes with vaporization at 150°. | | Colorless orthorhombic crystals. |
| Molybdenum Carbonyl, Mo(CO)$_6$ | 264.01 | 150° | 1.96 | Decomposes at 150° C | | Colorless orthorhombic diamagnetic crystals. |
| Tungsten Carbonyl, W(CO)$_6$ | 351.92 | 150° | | Vapor pressure, 20° C—0.01 mm. Hg, 102°C—15.5 mm. Hg. | | White orthorhombic crystals. |
| Cobalt Carbonyl, [Co(CO)$_3$]$_4$, [Co(CO)$_4$]$_2$. | 571.88 / 341.96 | 52° | 1.73 | Decomposes, 52° | 51 | Jet black solid. Orange solid. |
| Ruthenium Carbonyl, Ru(CO)$_5$, Ru$_2$(CO)$_9$. | 269.70 | 200° in absence of air. | | | 22 | White crystalline solid. |

TABLE II
*Properties of certain metal hydrides*

| | Molecular Weight | Decomposition Temp., °C. | Specific Gravity | Boiling Point, °C. | Melting Point, °C. | Physical Form |
|---|---|---|---|---|---|---|
| Lithium Hydride, LiH | 7.95 | | 0.82 | | 680° | White crystals. |
| Lithium Aluminum Hydride, 2LiAlH₄ | 75.82 | 125 | | | Melts with decomposition on rapid heating at 150°. | White crystals decomposed by water. |
| Tin Hydride, SnH₄ | 122.73 | −150 | | −52° Vapor pressure, 182 mm. at −80°. | | Colorless gas. |
| Antimony Hydride, SbH₃ | 124.78 | | 2.26 at −25° | −17° | −88° | Do. |
| Tellurium Hydride, TeH₂ | | | 2.57 at −20° | | | |
| Selenium Hydride, SeH₂ | | | 2.12 at −42° | | | |
| Chromium Hydride, CrH₃ | | 25 | 6.76 | | | Do. |
| Barium Hydride | 139.38 | 675 | 4.2 | 1,400° | | Gray crystals. |

For economic reasons, the decomposable gaseous metal compound used in each case is one that has a relatively low vaporization temperature that can be readily protected against decomposition in its passage to the reaction chamber. For example, with nickel carbonyl the temperature should be maintained below 175° F. until the gas is discharged from the nozzles into the reaction chamber where it is admixed with the hot gaseous stream of inert gas and caused to decompose. Where the temperature of such gaseous nickel carbonyl is maintained at about 160° F. until it is introduced into the reaction chamber, substantially no decomposition will occur in the moving gas until it is discharged into the stream of hot inert gas flowing downward through the reaction chamber. Nickel carbonyl (tetracarbonyl) decomposes rapidly at temperatures in excess of 375° F.

As the inert heating gas for admixing with the gaseous metal compounds in the reaction chamber carbon dioxide is preferably used. Other gases may be used in lieu of carbon dioxide such as nitrogen, nitrous oxide, helium, argon, etc., which gases are inert to the metal particles being formed and do not interfere with the disassociation of the gaseous metal compounds used in carrying out the process.

Although the particular dimensions of the reaction chamber are not critical, the point of admission of the cooling gas to terminate the reaction when the desired particle size is reached is an important feature of the invention. A reaction column has been found preferable. To this end, as will be understood, the area or zone of the reaction chamber where the cooling gas is introduced to chill and stop the gas decomposition and metal depositing action will be varied to suit the conditions imposed and particular gaseous metal compound or compounds being employed and size of metal particles desired.

Preferably the cooling gas is the same as the heating inert gas, although this is not essential. It is only necessary to use inert gas and which is free of water vapor where its presence is detrimental to the proper operation of the process. Thus carbon dioxide may be employed as both the heating and cooling gas. In the production of composite metal particles, the length of the zone occupied in the reaction chamber is adjusted whereby the proper amount of metal will be released to build up the metal particle to the desired extent while the gases are intermixed in the zone before passing to the next.

In carrying out the process rapid decomposition of the metal bearing gases introduced is achieved initially in zone A to provide the desired formation of small metal nuclei particles. As aforementioned, use of a gaseous mixture having a high concentration of the metal bearing compound and wherein it is rapidly decomposed results in the production of a large number of micro-fine particles of metal. These metal particles which are deposited out in its pure state in the gaseous medium and carried downward to the next zone where the metal particles thus formed may be subjected to additional gaseous metal deposition, as desired, the particles being at length chilled to stop the reaction and deposition of metal before the particle has grown larger than about one micron and preferably while it is of submicron size.

Metal carbonyls may be supplied in liquid form and then transformed into the gaseous state upon introduction in the reaction chamber. Nickel tetracarbonyl, for example, is a colorless liquid having a boiling point of 43° C. and the gaseous composition decomposes at temperatures of 190–205° C. and above. Iron pentacarbonyl is a yellow viscous liquid boiling at 102.5° C. and its vapors decompose at about 150° C. and above. Chromium hexacarbonyl is ordinarily in the form of colorless orthorhombic crystals which decomposes with vaporization at about 150° C. and above.

EXAMPLE I

This method deals with composite nickel and copper particles having a size of approximately one micron, hot carbon dioxide heated to a temperature of 600° F. and such as to cause rapid decomposition of the nickel carbonyl gas is introduced at the top of the reaction chamber at a rate of approximately 10 cubic feet per minute based on a reaction chamber diameter of 24 inches. Nickel carbonyl gas is admitted to zone A at flow rate equivalent to 3 pounds of liquid carbonyl per minute which is heated and forced into the reaction chamber.

The rapid decomposition of the nickel carbonyl causes precipitation and throwing out of very fine nickel particles which pass downward to zone B. In the latter zone, vapors of copper acetylacetonate are admitted to the nozzles and decomposed by the hot metal and gases flowing downwardly into zone C. A gas rate flow of five liters per minute of vaporized copper acetylacetonate is used. In this instance the nozzles 12 and 13 are shut off and cooling carbon dioxide gas at room temperature (70° F.) is admitted through the nozzles 28 at about four liters per minute to effect chilling and cooling of the gases as they pass downward from zone B thus stopping the decomposition and formation of metal deposit as the particles gravitate downwardly to the lower collecting chamber of the apparatus.

EXAMPLE II

I pass through a heating zone a metal bearing gas to form a metal particulate, particularly of submicron or low micron size. Then I pass these metal particulates through a gas of lower decomposition point and as the particulates are formed at the lower decomposition point, I utilize the second mentioned metal to coat the first mentioned metal. For instance, copper may be deposited on aluminum.

EXAMPLE III

I heat a metal bearing gas to its temperature of metal decomposition and as the metal falls I cause the temperature of the metal bearing gas to rise so that the gas will plate on any other material as it in turn at a different temperature is deposited. Optionally, you can cool the composite plating article without disturbing the plating operation to halt further deposition and then adjust the heat to a third metal bearing gas of a different type to bring about a second plate.

EXAMPLE IV

I heat a metal bearing gas, form the metal particulates in the low micron or submicron size and then pass the metal bearing gas at a predetermined point through an area of reduced temperature to stop the reaction in order to control the size of the metal particulate.

EXAMPLE V

I heat a metal bearing gas to deposit metal in a particulate form in the low micron and submicron size, I coat the free metal particulate while hot with a substance such as a stearate to prevent oxidation and then I pass the coated metal particulates into a low temperature area to stop further reaction and to halt the encasing coating.

EXAMPLE VI

I heat a metal bearing gas, extracting metal particulates of low micron or submicron size, I then chill the gas to stop the reaction of metal deposition in particulate form in order to regulate the size of the metal particulates, I then pass the metal particulates so formed through a higher temperature zone to heat the metal particulates. I then coat with a coating such as stearate the metal particulates to prevent oxidation and then I pass the coated metal particulates through a chilling zone to harden the coating.

In all of the foregoing examples, carrier gases such as nitrogen, argon, helium, etc. can be employed, preferably a heated gas, in addition to the heat zones, to move the metal particulates, in addition to the effect of gravity and also to maintain an atmosphere free of oxygen to prevent ignition of the metal particulates in view of their high reactivity.

To produce very fine metal particles of submicron size, for example, nickel particles alone, the process is carried out as described above using substantially pure nickel tetracarbonyl gas which is fed into the hot inert gas stream and the cooling gas zone moved up so that immediately upon the formation of nuclei particles of nickel by decomposition of the nickel carbonyl the cooling gas quenches the same and stops further deposition of metal. The very fine submicron particles of metal are thus removed from the gaseous metal plating zone by maintaining a layer of cold inert gas immediately below the gas plating zone.

By thus chilling and stopping the reaction at a desired point this prevents the formation of large particles or an agglomeration of metal particles. Further the method provides a high speed reaction for the formation of discrete metal particles of either one or more metals while at the same time preventing the building up of large size particles. Further, by controlling the concentration of gaseous metal compound present during the reaction, the metal particles are substantially of the same size and diameter. Further, by maintaining the walls of the container below the temperature at which the gaseous metal compound decomposes the formation of metal thereon is substantially eliminated and the particles made to form in the gaseous medium rather than adjacent and contiguous with the walls of the apparatus. This makes it possible to operate for long periods of time without the need for shutting down and cleaning the apparatus.

Certain metals such as nickel, platinum, iron, aluminum and the like are very effective catalysts, especially where hydrogen is concerned, and in processes involving catalysis in the vapor phase. The significant behavior of such catalysts is thought to be related to the fact that these metals have the power of absorbing or adsorbing large volumes of gases onto the surface of metal. It is further believed that the gases contained in the reacting mixture are condensed on the surface of the metal in a layer of a molecular thickness thus greatly increasing the reacting surface of the substance and enhancing the rate of the reaction. In the use of such catalysts the acceleration created has been too great to be accounted for altogether by this reasoning, but it is fairly well established that the greater the surface area of the catalyst the greater the effect and acceleration given the reaction.

Utilizing this invention, finely divided solid catalysts having special utility in carrying out vapor phase reactions or treatments may be produced.

The chief advantages of using a catalyst in the form of finely divided particles which are of substantially equal size is that they can be used as a fluidized catalyst and transported to various parts of a plant. Metal submicron and low micron particles made in accordance with this invention, whether of single or composite metal composition, may thus be used to provide a fluidized bed of metal particulates, which partially take up or give off heat for an appreciable time. Such particles being of uniform size and discrete form come to a temperature equilibrium with the gas phase more rapidly than otherwise would be the case, thereby supplying or removing the desired heat mainly in the fore part of the reaction zone where it is desired. Thus, for example, in the hydrogenation of naphthenic hydrocarbon with composite metal catalyst such as, for example, may be made in accordance with this invention, and consisting of platinum-on-alumina or the like, and in which case the auxiliary gas may advantageously be hydrogen, approximately 75% conversion can be obtained at a high space velocity of 250 (liquid hourly space velocity). This corresponds to a contact time of only a few thousandths of a second.

For carrying out such reaction and catalysis, it is highly desirable to employ catalysts having very fine particles in the order of a micron or submicron to increase the surface area contact.

Heretofore such catalyst particles have been on the order of 300 or 400 microns in diameter, which of course, lowers the area of contact surface with respect to the catalyst so that more catalyst has to be used than otherwise would be necessary, and, furthermore, the reaction is slowed down. Also it is sometimes desirable in such catalysis to apply the catalytic metal only to the outside of a core particle, which core particle is relatively dense, inert and non-porous as silica, colloid clays and the like. Such a particle may be produced in accordance with applicant's invention by first forming a dense nuclei metal particle and then flash coating the same in the next zone with the metal which is desired to be used as the catalyst.

In carrying out the process of the invention, where the flow rate of gases throughout the reaction chamber is desired to be carried out under vacuum, as may be the case with the use of certain gaseous metal compounds which have a relatively high vaporization temperature, then the exhaust line from the reaction chamber may be connected to a suitable evacuating pump and the apparatus operated in the manner described. Further, it will be understood that initially, to start the operation, the reaction chamber is denuded of air by first sweeping out the same by the introduction of drawing off of the inert gas, such as carbon dioxide, helium, nitrogen, nitrous oxide or the like, which is to be used to fill the reaction chamber or act as a carrier for the gaseous metal bearing compound.

It will be understood that while there have been illustrated and described different embodiments and apparatus for carrying out the method and production of the finely divided micron and submicron metal powders in accordance with this invention, it is not intended thereby to have the invention restricted thereto or limited by the specific details herein specified. Accordingly, the invention is intended to cover apparatus and modifications of the invention which may be made by those skilled in the art without departing from the spirit and scope of the disclosure and as more particularly pointed out in the appended claims.

I claim:
1. In a method of producing simultaneously a succession of metallic particulates of low micron and sub-micron size comprising passing metal bearing gases through at least two heating zones, each of said zones being adapted by its particular heat to match the heat of decomposition of each metal bearing gas, whereby the metal particulates of low micron and submicron size are deposited as each gas passes through the heating zone that is the zone of its decomposition heat.

2. In a method for producing metal powder the metal particles of which are of low micron and sub-micron size, said method comprising establishing a metal bearing gaseous compound, flowing the same through an elongated chamber comprising a plurality of zones at different temperatures, contacting said metal bearing gaseous compound with a heated gaseous medium in one zone which zone is at a temperature to cause decomposition of said metal bearing gas whereby metal particles are precipitated, thereafter immediately cooling said metal bearing gas to arrest further decomposition of the same and recovering said metal particles, said chamber being maintained under vacuum pressure and substantially free of oxygen.

3. An article of manufacture which comprises metal particles which are discrete and made in accordance with the method of claim 1, said particles having a size on the order of one micron or less in diameter and being composed of oxygen-free virgin metal.

4. An article of manufacture which comprises metal particles which are discrete and made in accordance with the method of claim 1, said metal particles being composed of virgin metal and of a particle size on the order of 0.1 to 0.001 micron in diameter.

5. An article of manufacture which comprises metal particles made as set forth in claim 1 and which are discrete and on the order of one micron or less in diameter and which are composed of oxygen-free virgin metal, said metal particles being on the order of 0.1 to 0.001 micron in diameter.

6. In a method of producing metal powder the metal particles of which are of low micron and sub-micron size, said method comprising establishing a metal bearing gaseous compound, flowing the same through an elongated chamber comprising a heating zone, contacting said metal bearing gaseous compound in said zone with a heated gaseous medium to heat said metal bearing gaseous compound to a temperature to cause thermal decomposition of said metal bearing gaseous compound whereby metal particles are precipitated, thereafter immediately cooling said metal bearing gaseous compound to arrest further decomposition of the same and recovering said metal particles, said chamber being maintained substantially free of oxygen.

References Cited in the file of this patent
UNITED STATES PATENTS

| | | |
|---|---|---|
| 1,836,732 | Schlecht et al. | Dec. 15, 1931 |
| 1,840,286 | Hochheim | Jan. 5, 1932 |
| 2,259,457 | Croll | Oct. 21, 1941 |

FOREIGN PATENTS

| | | |
|---|---|---|
| 1,076,496 | France | Oct. 27, 1954 |

OTHER REFERENCES

The Journal of the Electrochemical Society, October 1951, pages 385, 386 and 387.